DEVICE FOR AUTOMATIC FREQUENCY-CORRECTION

Filed Dec. 2, 1947

EDUARD HERMAN HUGENHOLTZ
INVENTOR.

BY Fred M Vogel

AGENT.

Patented Sept. 11, 1951

2,567,286

UNITED STATES PATENT OFFICE 2,567,286

DEVICE FOR AUTOMATIC FREQUENCY CORRECTION

Eduard Herman Hugenholtz, Eindhoven, Netherlands, assignor to Hartford National Bank and Trust Company, Hartford, Conn., as trustee Application December 2, 1947, Serial No. 789,201
In the Netherlands December 5, 1946

3 Claims. (Cl. 250—36)

Figure 1:
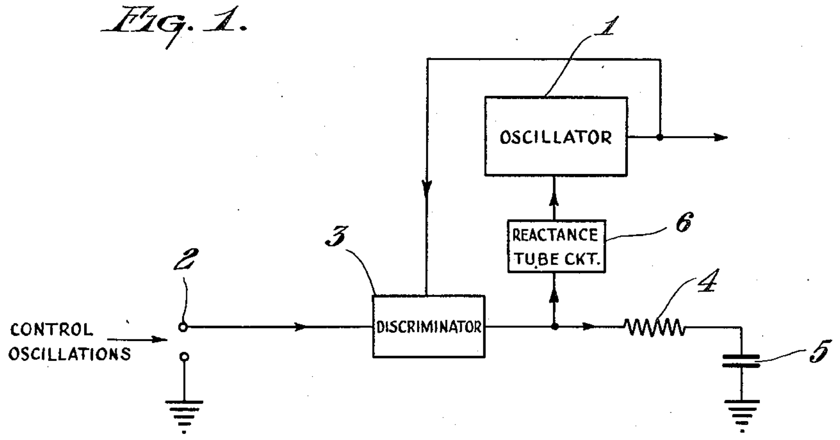

The invention relates to a device for automatic frequency-correction, for example for the sake of automatically keeping constant the tuning frequency of a transmitter-oscillator, for automatic correction of the frequency of the local oscillator in a receiver or the like.

In devices of this kind the frequency to be corrected is automatically brought into accordance with the frequency of a control oscillation, or else a definite frequency difference relative to the control oscillation is maintained.

With such devices it is common practice for the control voltage produced by means of a discriminator circuit to be fed through a smoothing filter having an output condenser to a current- or voltage-dependent control impedance, for example an electronic discharge tube operating as a reactance of variable value, an inductance coil comprising a ferromagnetic core, the superimposed magnetisation of which is acted upon, or the like.

A disadvantage of the use of such control impedances operating in an inertialess manner is that, if the control oscillation fails, for example owing to fading, and consequential failing to appear of the control voltage, the frequency to be corrected is reduced to a mean value.

In order to obviate this disadvantage, it is known to make the time constant of the control circuit comparatively large, but the advantages of the control impedance operating in an inertialess manner are thus counteracted in part.

It has also been suggested to realize the control circuit in such manner that in the event of failure of the control oscillation, or else as soon as its amplitude is reduced below a given value, the resistance of the discharge circuit of the above-mentioned output condenser of the smoothing filter is increased, either by the choice of a suitable supply circuit for the smoothing filter or by interruption of the connecting lead between the smoothing filter and its supply circuit. Even in this case the condenser has a detrimental effect on the control time constant.

The invention is based on recognition of the fact that in the use of a circuit-arrangement of the type referred to in the preceding paragraph, it is possible for undue variation of the corrected frequency upon the control oscillation becoming uneffective to be avoided in a particular simple manner to an extent which suffices for practical purposes without any harmful effect on the control speed when the control oscillation is operative.

According to the invention the control voltage fed to the control impedance operating in an inertialess manner is abstracted from the output condenser of the smoothing filter and from a series impedance included in the condenser charging circuit.

The said series impedance, which may be formed, for example, by a longitudinal resistance generally included in the smoothing filter, when the control oscillation is operative, prevents inadmissible increase in control time constant owing to the presence of the condenser, whereas, when the control oscillation is inoperative, the value of the output condenser decides the discharge time-constant and prevents excessively rapid discharge by leak currents.

Figure 2:
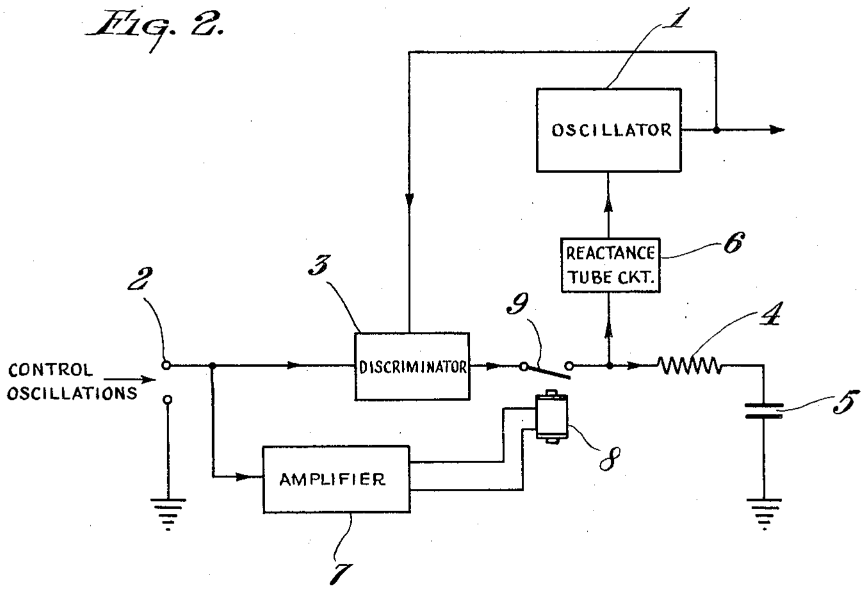

In order that the invention may be more clearly understood and readily carried into effect, it will now be described more fully with reference to the accompanying drawing wherein Figure 1 is a schematic circuit diagram of one preferred embodiment of the invention, and Figure 2 is a schematic diagram of another preferred embodiment.

Referring to the drawing, 1 designates an oscillator, the frequency of which is automatically corrected relatively to a control oscillation supplied at 2. For this purpose the control oscillation and the oscillation produced by the oscillator 1 are supplied to a discriminator circuit 3 which supplies the control voltage which is fed to the series combination of a resistance 4 and a condenser 5. The control voltage set up across this series combination controls a reactance tube 6 (shown diagrammatically), which is connected, for example, in parallel with the frequency-determining circuit of the oscillator 1. The circuit elements 1, 3 and 6 used are generally known and need not be explained more further.

When the control oscillation is operative, the influence of the condenser 5 is practically negligible, as a result of the series resistance 4 and suitable proportioning, so that the condenser 5 does not affect the reaction speed of the control arrangement.

Upon the control oscillation becoming inoperative, in which case the time constant of the discharge circuit of the condenser 5 through the resistance 4, the discriminator circuit 3 and the input terminals 2, is automatically increased, which may be achieved by proper choice of the discriminator circuit 3 or else by the use of an interrupting contact 9 which is controlled by a minimum relay 8 connected to an amplifier 7 for the control oscillation 2 and which is included in the connection lead of the discriminator circuit 3 and the series resistance 4 (shown in dotted lines in the figure), the charge of the condenser 5 becomes operative as a control voltage for the reactance tube 6. If the value of the condenser 5 is sufficient, this control voltage, due to the leak currents, will vary only very slowly, as will therefore also the corrected oscillation frequency. The series impedance may be inductive.

In experimental use it has been found that in this manner a disturbing variation of the oscillator frequency on the control oscillation becoming inoperative could thus be avoided for 15 to 20 seconds.

What I claim is:

1. An automatic-frequency-control system for synchronizing the frequency of an oscillator having a resonant frequency-determining element with the frequency of a source of control oscillations, said system comprising frequency discriminating means whose input circuit is coupled both to said oscillator and said source and whose output circuit yields a control voltage proportional to the frequency difference existing between said oscillator and said source, said output circuit having a value of impedance which in the absence in said input circuit of said control oscillations from said source is high relative to the value exhibited during said control oscillations, a voltage-responsive variable reactance device coupled to said resonant element of said oscillator to vary the frequency thereof, means to apply said control voltage to said reactance device to vary the frequency of said oscillator whereby synchronism is effected between said oscillator and said source, a capacitance, an impedance member connected in series with said capacitance across the output circuit of said discriminating means, said impedance member and said capacitance having respective values at which the time constant of the network formed thereby in connection with the impedance of said output circuit is relatively long in the absence of control oscillations from said source in said input circuit and during the existence of said control oscillations is relatively short whereby the effect of said capacitance on said discriminating means during the existence of control oscillations is substantially negligible.

2. An automatic-frequency-control system for synchronizing the frequency of an oscillator having a resonant frequency-determining element with the frequency of a source of control oscillations, said system comprising frequency discriminating means including a discriminator coupled both to said oscillator and said source and having an output impedance across which is developed a control voltage proportional to the frequency difference between said oscillator and said source, an electromagnetic relay having an energizing winding and a normally closed switch actuated thereby, said switch being connected in series with the output impedance of said discriminator, and means coupled to said source and responsive to an interruption therein for energizing said winding to actuate said switch, said output impedance in series with said switch defining the output circuit of said discriminating means, a voltage responsive variable reactance device coupled to said resonant circuit to vary the frequency thereof, means to apply the control voltage from said output circuit to said device to vary the frequency of said oscillator whereby synchronism is effected between the frequencies of said oscillator and said source, a capacitance, an impedance member connected in series with said capacitance across said output circuit, said impedance member and said capacitance having respective values at which the time constant of the network formed thereby in connection with said output circuit is relatively long during an interruption in said control oscillations.

3. An automatic-frequency-control system for synchronizing the frequency of an oscillator having a resonant frequency-determining element with the frequency of a source of control oscillations, said system comprising frequency discriminating means including a discriminator coupled both to said oscillator and said source and having an output impedance across which there is developed a control voltage proportional to the frequency difference between said oscillator and said source, an electromagnetic relay having an energizing winding and a normally closed switch actuated thereby, said switch being connected in series with the output impedance of said discriminator, and an amplifier coupling said source and said winding and responsive to an interruption in said control oscillations for energizing said winding, said output impedance in series with said switch defining the output circuit of said discriminating means, a reactance tube having a control electrode coupled to said resonant circuit to vary the frequency thereof, means to apply the control voltage from said output circuit to said control electrode to vary the frequency of said oscillator whereby synchronism is effected between the frequencies of said oscillator and said source, a capacitance, an impedance member connected in series with said capacitance across said output circuit, said impedance member and said capacitance having respective values at which the time constant of the network formed thereby in connection with the output circuit is relatively long during an interruption in said control oscillations.

EDUARD HERMAN HUGENHOLTZ.

REFERENCES CITED

The following references are of record in the file of this patent:

UNITED STATES PATENTS

| Number | Name | Date |
|---|---|---|
| 2,044,749 | Usselman | Jan. 16, 1936 |
| 2,240,428 | Travis | Apr. 29, 1941 |
| 2,312,079 | Crosby | Feb. 23, 1943 |
| 2,396,688 | Crosby | Mar. 19, 1946 |
| 2,483,594 | Oliver | Oct. 4, 1949 |